Figure 1:
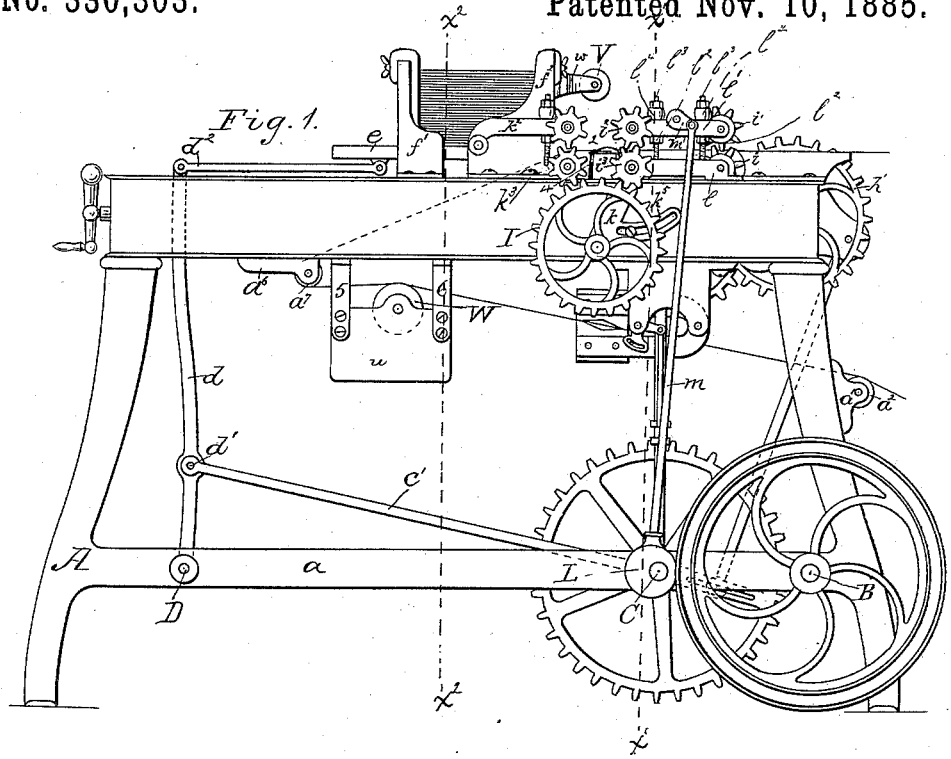

(Model.) 7 Sheets—Sheet 1.

G. B. DURKEE & A. CAMPBELL.
BOOK BINDING MACHINE.

No. 330,303. Patented Nov. 10, 1885.

Witnesses:
Frank Thomason
Albin H. Doe

Inventors
George B. Durkee
Angus Campbell
James H. Layne Atty.

(Model.)

7 Sheets—Sheet 2.

G. B. DURKEE & A. CAMPBELL.
BOOK BINDING MACHINE.

No. 330,303. Patented Nov. 10, 1885.

Witnesses:
Frank Thomason
Albert H. Dae

Inventors
George B. Durkee
Angus Campbell
James Hoyne Atty (Model.) 7 Sheets—Sheet 3.
G. B. DURKEE & A. CAMPBELL.
BOOK BINDING MACHINE.
No. 330,303. Patented Nov. 10, 1885.
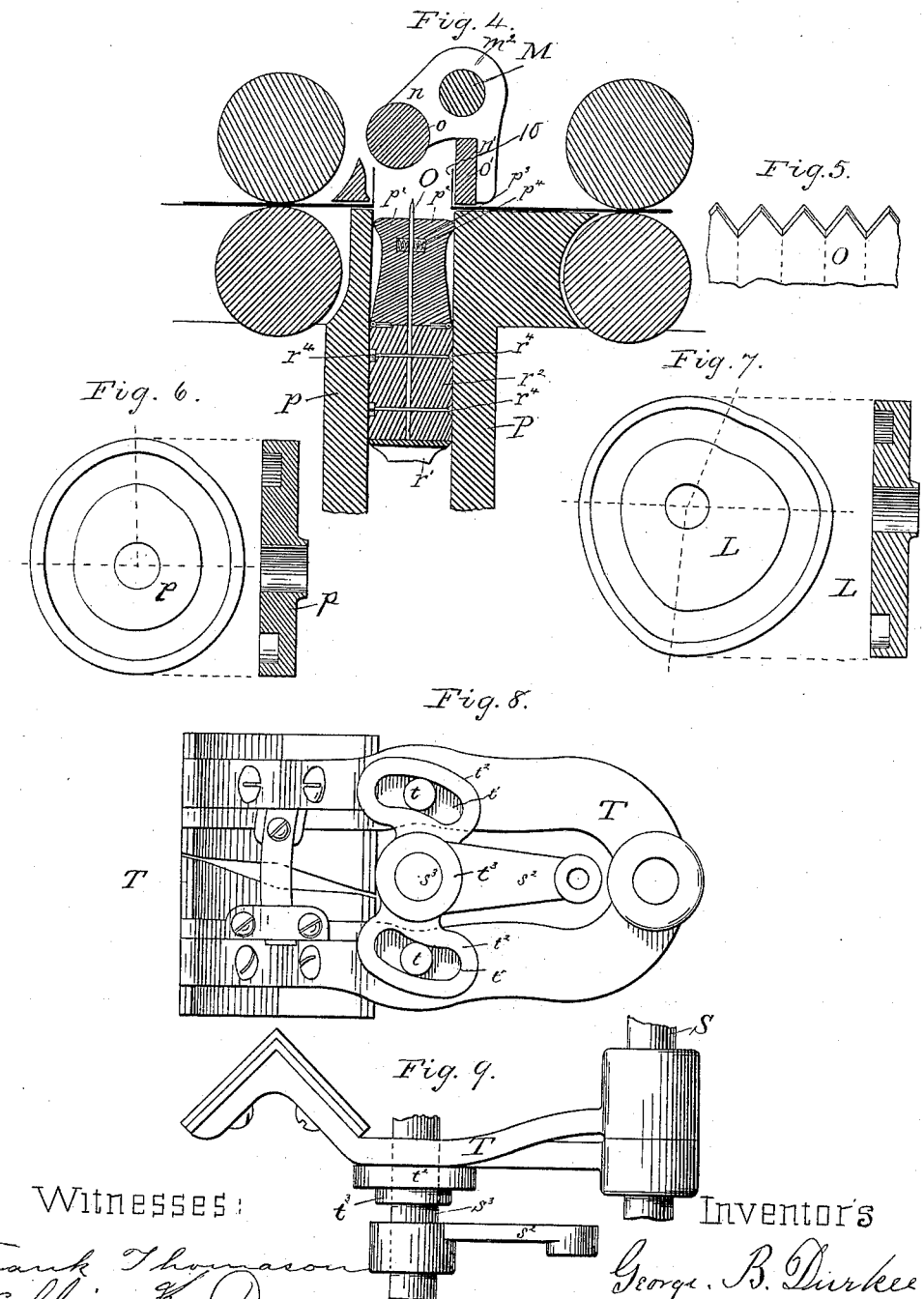
Witnesses:
Frank Thomason
Albin K. Doe
Inventors
George B. Durkee
Angus Campbell (Model.)
7 Sheets—Sheet 4.
G. B. DURKEE & A. CAMPBELL.
BOOK BINDING MACHINE.
No. 330,303.
Patented Nov. 10, 1885.
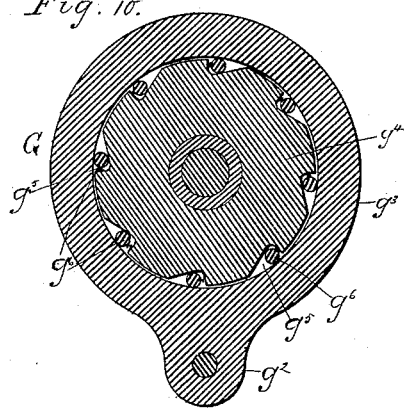
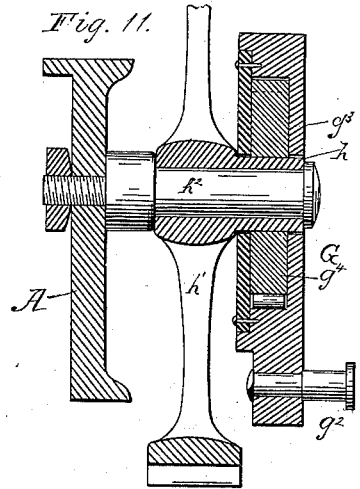
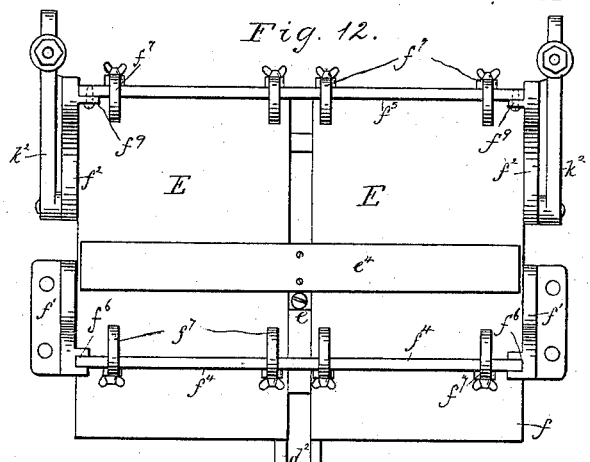
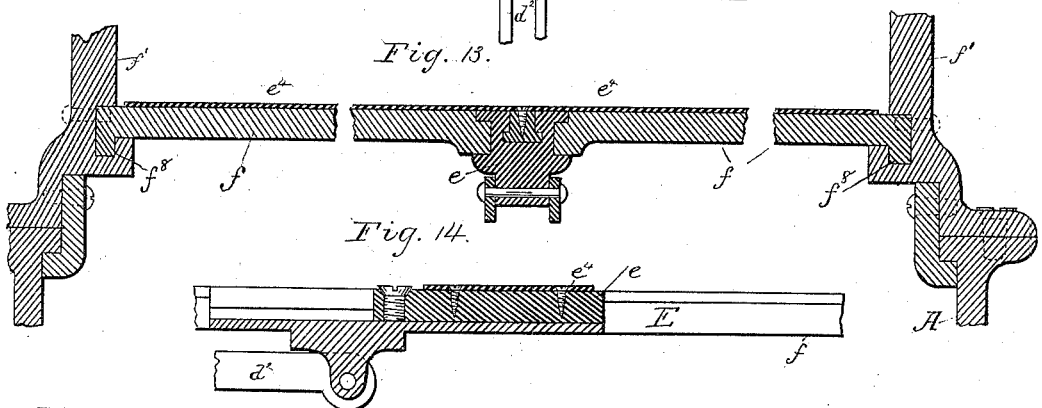
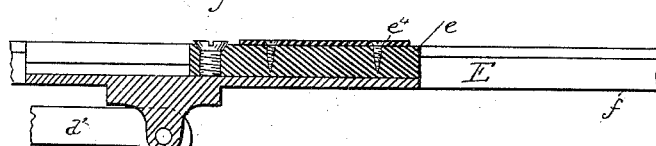
Witnesses:
Frank Thomason
Albin K. Dae
Inventors
George B. Durkee
Angus Campbell
James H. Coyne Atty.

(Model.) 7 Sheets—Sheet 5.

G. B. DURKEE & A. CAMPBELL.
BOOK BINDING MACHINE.

No. 330,303. Patented Nov. 10, 1885.

Witnesses:
Frank Thomason
S. S. Schoff

Inventor:
George B. Durkee
Angus Campbell
By James N. Coyne, Atty.

(Model.)

G. B. DURKEE & A. CAMPBELL.
BOOK BINDING MACHINE.

No. 330,303. Patented Nov. 10, 1885.

Witnesses:
E. W. Schirach
S. S. Schoff

Inventors.
George B Durkee & Angus Campbell
By James H. Coyne
Atty.

(Model.)

7 Sheets—Sheet 7.

G. B. DURKEE & A. CAMPBELL.
BOOK BINDING MACHINE.

No. 330,303.  Patented Nov. 10, 1885.

Witnesses:
Edward W. Schirach
Jno. W. Sickels.

Inventors.
George B Durkee
And Angus Campbell.
By James H. Coyne
Atty.

UNITED STATES PATENT OFFICE.

GEORGE B. DURKEE, OF CHICAGO, ILLINOIS, AND ANGUS CAMPBELL, OF HAMILTON, ONTARIO, CANADA, ASSIGNORS OF ONE-THIRD TO ALBIN K. DOE, OF CHICAGO, ILLINOIS; SAID DURKEE ASSIGNOR OF HIS REMAINING RIGHT TO SAID CAMPBELL AND DOE.

BOOKBINDING-MACHINE.

SPECIFICATION forming part of Letters Patent No. 330,303, dated November 10, 1885.

Application filed November 17, 1881. Serial No. 46,016. (Model.)

*To all whom it may concern:*

Be it known that we, GEORGE B. DURKEE, of Chicago, county of Cook and State of Illinois, and ANGUS CAMPBELL, of Hamilton, in the county of Wentworth, Province of Ontario, Canada, have invented certain new and useful Improvements in Bookbinding-Machines; and we do hereby declare that the following is a full, clear, and exact description thereof, reference being had to the accompanying drawings, and to letters of reference marked thereon, which form a part of this specification.

Our invention relates to a machine for making the "raw cases" or covers and backs of books rapidly, perfectly, and cheaply. It takes the cloth or leather from a roll, prepares and cuts it into the size required, feeds pasteboards of the proper dimensions to and unites them with the cloth, and completes the covers preparatory to uniting them with the books. The machine is provided, first, with a hopper having adjustable gage-fingers and a vertically-adjustable front board; second, with miter knives or shears for cutting a miter out of the cloth as it travels from the first guide-rollers to the gluing-rollers, so as to allow it to be properly folded over the edges and corners of the pasteboard; third, with a knife operating in a slide running transversely across the machine to cut into proper lengths the cloth necessary for said covers; and it is moreover provided with suitable means for supplying, feeding, gluing, and uniting the cloth and pasteboard, as hereinafter more fully described, and as illustrated in the drawings.

Figure 2:
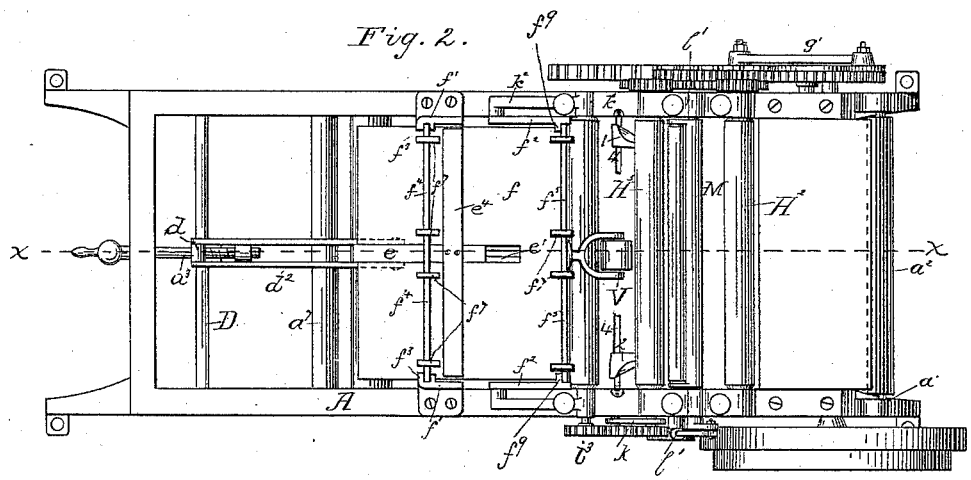
Figure 3:
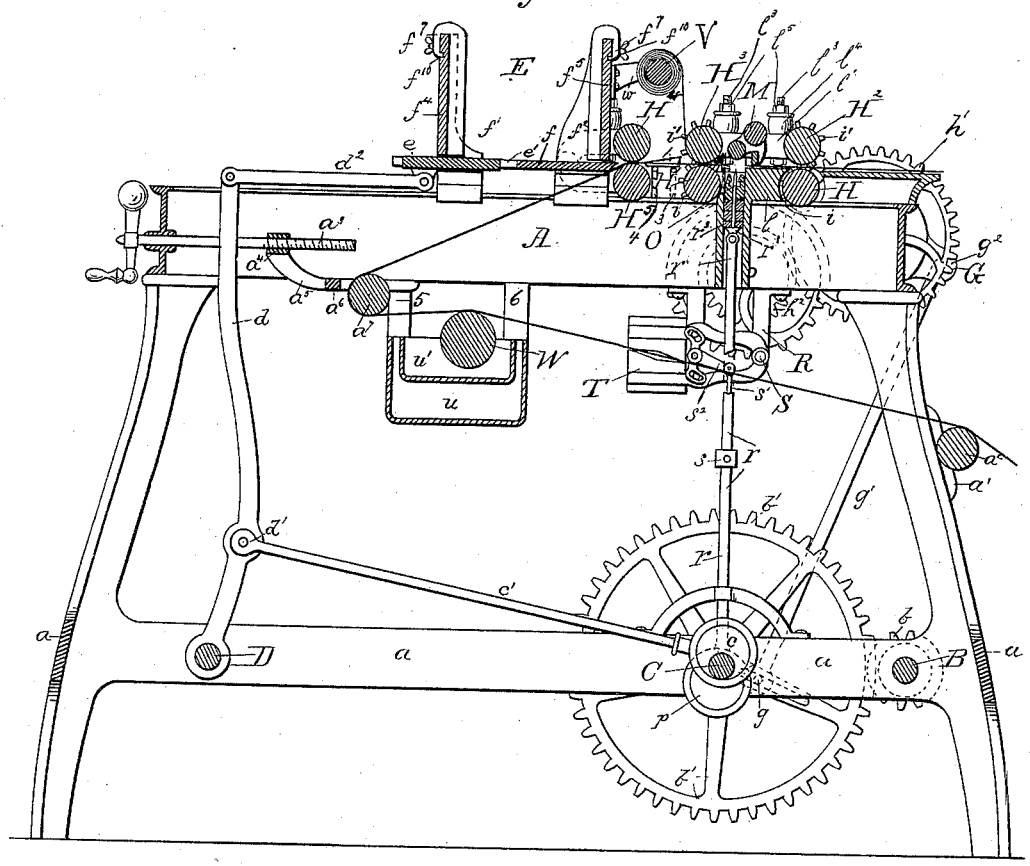
Figure 15:
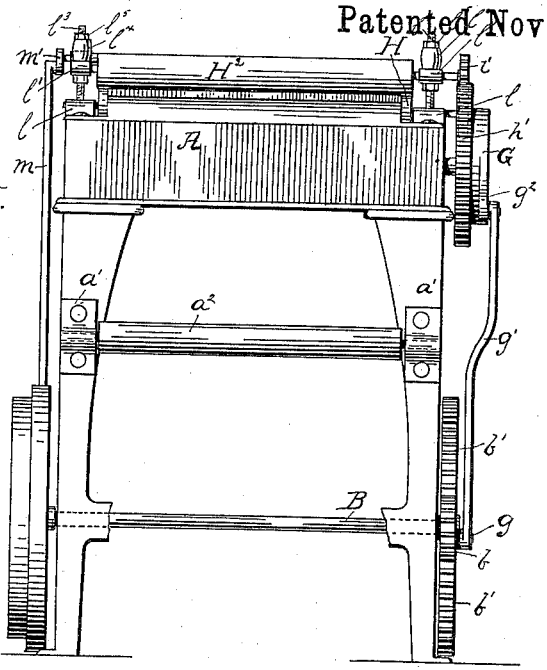
Figure 16:
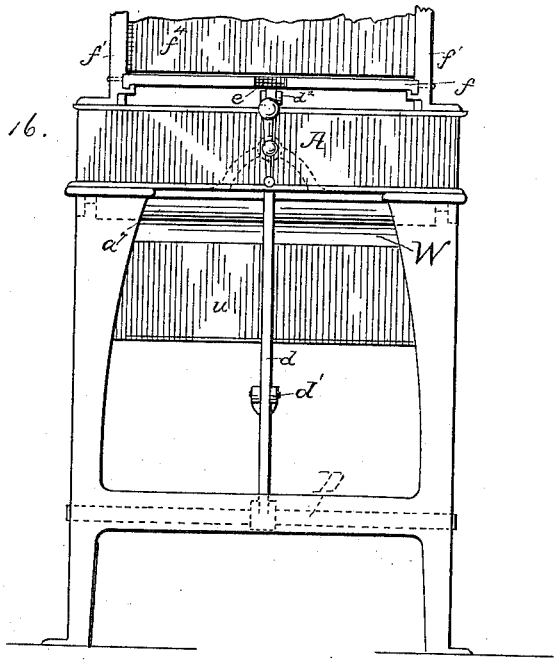
Figure 18:
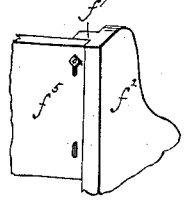
Figure 17:
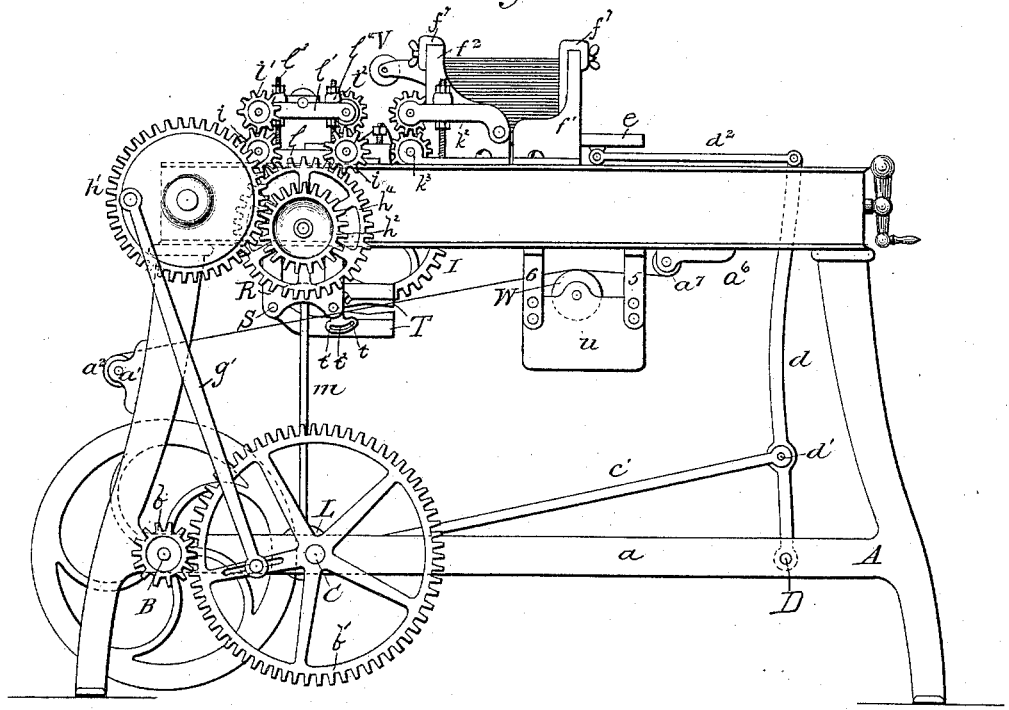
Figure 19:
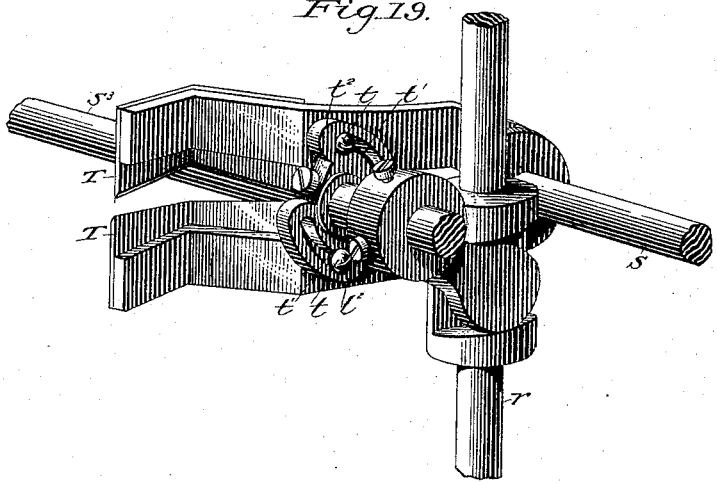

In the drawings, Figure 1 is a side elevation. Fig. 2 is a plan view. Fig. 3 is a longitudinal vertical section in the dotted lines $x\ x$, as shown in Fig. 2. Fig. 4 is a detail sectional view of the end folding and cutting device, showing the relative location of the feed-rollers. Fig. 5 is a detail view of the cutting-off knife. Figs. 6 and 7 show, respectively, detail views of the knife and folder-cams. Figs. 8 and 9 are side and plan views of the miter-shears, respectively. Figs. 10 and 11 are detail views of the friction-clutch. Fig. 12 is a plan view of the hopper, and Figs. 13 and 14 are detail views of the hopper-slide and feeding device. Fig. 15 is an end view of the machine as seen from the right-hand side of Fig. 1. Fig. 16 is an end view as seen from the left-hand side of Fig. 1. Fig. 17 is a side elevation taken from the side opposite to that shown in Fig. 1, and Fig. 18 is a detail view showing one corner of the hopper in perspective, illustrating the manner in which the front board is made adjustable vertically; Fig. 19 is a detail view showing the miter-shear.

In the drawings, A represents an iron frame supported on angle-iron legs, which are connected with longitudinal and transverse cross-beams $a\ a\ a a$, the longitudinal cross-beams being provided with bearings for the driving-shaft B, eccentric-shaft C, and lever-shaft D. Fastened to the legs of the machine, nearest the driving-shaft B, are brackets $a'\ a'$, having bearings for the guide-roller $a^2$, which receives the cloth from a reel and gives it the proper inclination between said guide-roller and the gluing-roller, in order that the miter-shears may work effectively. Passing through the frame at the other end of the machine midway between the sides is a screw-shaft, $a^3$, which, passing into the machine, passes through a slot in the lever $d$, and has on or near its end a nut, $a^4$. This nut has extending downward from it an arm, $a^5$, which is attached to the frame $a^6$, moving on slides on the under surface of the sides of the frame A, and having bearings for the gage-roller $a^7$. The screw-shaft $a^3$ has on its outer end a balance-crank, by means of which the screw is operated, thus regulating the exact location of the gage-roller, which, in conjunction with the first pair of feed-rollers, is adjustable for the purpose of spacing the distance traveled by the cloth between the miter-shears and cutting-off knife into whole spaces corresponding to the length of the covers being made, so that the incision made by the cutting-off knife may separate the cloth from apex to apex of the miters cut in the sides of the cloth.

The driving-shaft B is operated by belt and speed-pulley, which is placed on one end of the shaft outside the cross-beams $a$. At the opposite end of the shaft is a pinion, $b$, as shown in Fig. 3, which meshes with the gear-wheel $b'$ on the end of the eccentric-shaft $c$.

Exactly midway on the shaft C is an eccentric, $c$, which operates the eccentric-rod $c'$. This rod is jointed to the lever $d$ at $d'$, said lever being fulcrumed on the shaft D. This lever extends upward through the machine to just above the frame A, where it is jointed to the rod $d^2$, the other end of which is attached to the lugs of the feed-slide $e$. This feed-slide $e$ moves in the longitudinal slot $e'$ in the bed-plate $f$ of the hopper E, as shown in Figs. 12 and 13. Secured to the slide $e$ by means of set-screw is a thin steel plate or slat, $e^4$, not thicker than the thinnest pasteboard, which is placed transversely across the bed of the hopper. The eccentric operating the feed-slide is so set on the shaft that it moves the slide just sufficient for the steel plate $e^4$ to push the bottom layer of pasteboard in the hopper to the first series of feed-rollers, and this it does immediately before the friction-clutch imparts its intermittent motion to the feed-rollers, as will be hereinafter more fully described.

The hopper E is of a rectangular shape, extending from one side of the machine to the other. It is provided with adjustable side pieces, $f'f'$ and $f^2 f^2$, resting on the upper surfaces of and secured to the flange on the upper and inner rim of the sides of the frame A by means of set-screws, as shown in Fig. 2, Sheet 1. The side pieces, $f'f'$, are provided on the inside with two vertical projecting lips, $f^3$, forming a guide for the end board, $f^4$.

The bed-plate is attached to the side pieces, as shown in Fig. 12, Sheet 4, at $f^8$, in such a manner as to allow the side pieces, $f'$, to be adjusted to suit any desired length of pasteboard that may be inserted in the hopper. The side piece, $f^2 f^2$, are provided with a vertical flange, $f^9$, on the inside, as shown in Fig. 2, against which the front board, $f^5$, rests, and is secured by means of set-screws passing through slots in said flange or by slotting the end boards vertically adjacent to said flanges, so as to allow the front board to be adjusted above the bed-plate sufficiently to permit the exit of any thickness of pasteboard. The bed-plate $f$ is secured to the side pieces, $f^2 f^2$, in the same manner as the side pieces, $f'f'$; but as it is desirable to have the bed-plate permanently fastened, set-screws or pins are used, passing through the side pieces, $f^2 f^2$, and the flange of the bed-plate, as shown in dotted lines in Fig. 13. Riding on the front and back boards, $f^4$ $f^4$ and $f^5 f^5$, are two series of four guide-slides, $f^7$, used to locate and hold in proper place within the hopper the piles of pasteboard. They are provided with fingers $f^{10}$, which enter the longitudinal grooves on the outside of the front and back boards, and with thumb-screws passing through to secure them in any desired position.

It will be readily perceived that the hopper E, as above described and constructed, may be made to receive boards of any desired dimensions by adjustment of the adjustable side pieces, $f'f'$, carrying the back board, $f^4$, and gage-slides $f^7 f^7$, and that the pasteboards may be supplied to the hopper without delay or inconvenience while the machine is in operation.

The gear-wheel $b'$ is provided with several arms, one of which is slotted to receive the crank-pin $g$ in one end of the connecting-rod $g'$. This pin can be adjusted, by means of a set-nut, to any radius within the limits of the slot, thus imparting a reciprocating motion to the friction-clutch of any desired throw, by means of the connecting-rod $g'$, which is jointed to the lug $g^2$ on said clutch.

The friction-clutch G, as shown in detail in Figs. 10 and 11, Sheet 4, consists of a hollow shell or casing, $g^3$, moving loosely on the sleeve $h$, which is an extension of the hub of the gear-wheel $h'$, revolving on the stud $h^2$, projecting from the side of the frame A. This shell $g^3$ incases the disk $g^4$, which is keyed to the sleeve $h$, and is provided on its periphery with inclined pockets $g^5$, in which are placed small cylindrical bars $g^6$ of a diameter a little less than the depth of the pockets $g^5$, and pressing against them small springs, as shown in Fig. 10, so that when the casing is drawn downward by the motion of the connecting-rod, as shown in Fig. 3, the annular surface of the casing engages with the cylindrical bars, rolling them up the inclines of the pockets and imparting the motion of the casing to the disk $g^4$ and the gear-wheel $h'$. In its upward motion or return-stroke the bars $g^5$ are disengaged and the disk $g^4$ and gear $h'$ remain still. Thus an intermittent motion is imparted to all that machinery which acquires its motion from the friction-clutch, all of which is necessary to the object to be obtained, as will be hereinafter more fully explained.

The gear-wheel $h'$ engages with the pinion $h^3$, keyed on the sleeve $h$, formed by an extension of the hub of the gear $h^4$, which revolves on the stud projecting from the frame A. The gear-wheel $h^4$ imparts the intermittent motion given it by the gear $h'$ to the pinions $i\,i$, on the ends of the rollers H and H'. These pinions engage with the upper pinions, $i'\,i'$, on the ends of the two upper feed-rollers, H² and H³, which are placed immediately over the lower feed-rollers, H and H', as shown in Fig. 3. The motion is transmitted to the feed-rollers H⁴ and H⁵ through the adjustable swinging gear I, which revolves on the stud in the end of the adjustable swinging arm $k$, which is fulcrumed on the journal of the feed-roller H', and engages with the pinion $i^3$ on the end of said roller. The roller H⁵ is journaled in the bearing $k'\,k'$ in the ends of the arms $k^2 k^2$, which are pivoted to the side pieces, $f^2 f^2$, of the hopper E, and the roller H⁴ is journaled in the ends of the rigid arms $k^3 k^3$, extending from and forming part of said side pieces, $f^2 f^2$, all as shown in Fig. 1. The rollers H⁴ and H⁵ being attached to the side pieces, $f^2$, of the hopper F move with it when it is adjusted on the frame A. To allow of this adjustment without interfering with the intermittent motion of the rollers H⁴ and H⁵, the arm k has projecting from it an extension, k⁵, in which is a slot describing a segment of a circle struck from the center of the roller H', which, by means of a set-screw passing through it and into the frame A, allows the arm k to be so adjusted as to maintain the connection of the adjustable swinging gear I and the pinions on the ends of said rollers H⁴ and H⁵, as shown in Fig. 1.

The feed-rollers H and H' are journaled in the journal-boxes l l, resting on and secured to the frame A. The upper feed-rollers, H² and H³, are journaled in the journal-boxes l' l', which are supported and adjusted by nuts on the studs l³ l³, as shown in Fig. 1. Just above the journal l' l', and on the studs, are springs l⁴ l⁴, the pressure of which is regulated by the nuts l⁵ l⁵. These springs allow the passage between the rollers of any unusual obstruction without interfering at all with the operation of the machine. The rollers H⁴ and H⁵ are provided with similar pressure-regulating devices, all as shown in Fig. 1, Sheet 1.

On the eccentric-shaft C, on each side of the machine and just within the cross-beams, are two cams, p p, (shown in detail in Fig. 6,) for operating the cutting-off knife O by means of the connecting-rods r r, which are attached to the lugs r' on the ends and under side of the transverse bed-block r², which holds and secures the knife by means of small bolts and nuts r⁴ r⁴. Resting on and hinged to the bed-block r² are two blocks, p² p², one on either side of the knife O, whose inner surfaces are provided with small recesses p³ p³, in which are inserted small springs p⁴ p⁴, giving said blocks a tendency to press sidewise or laterally when the cutting-off knife is pushed upward by the action of the rods r r, thus liberating said blocks p² p² from the confines of the slide P, in which the whole knife mechanism moves. The knife O presents a serrated edge, as shown in Fig. 5, so that the points of each section may enter the cloth first, thus avoiding the resistance which an unbroken knife-edge would necessarily encounter. If desired, each section may be made separate, as indicated in dotted lines, Fig. 5, for convenience in sharpening said knife. The outer surfaces of the blocks p² p² are shaped and the whole knife mechanism is constructed substantially as in Figs. 3 and 4 of the drawings.

On that end of the eccentric-shaft on the side to which the motive power is applied to the machine is a cam, L, (shown in Fig. 7,) which operates the rod m. This rod m is pivoted at its upper end to the arm m' on the contiguous end of the shaft M, which is properly journaled in the bearings l' l'. Near either end of the folding-shaft M, just within and contiguous to the bearings l' l', are the bosses m² m², having extending downward therefrom the arms n and n', arranged at about an angle of thirty-five degrees (35°) to each other. The arms n n have suitable bearings near their extremities for the folding-roller o, and the arms n' n' have connecting their extremities the pressure-bar o'. After the cloth and pasteboard have been united by the first and second series of rollers, and the knife and contingent mechanism for folding the cloth up at right angles to the adjacent edges of the pasteboard have performed their functions and are withdrawing, the folding-roller o and pressure-bar o' are about in the position shown in Fig. 4, ready to fold and unite the cloth at right angles to the end edge of the pasteboard under the pressure-bar into the upper surface of the same. Thus it will be perceived the pressure-bar merely holds the preceding board and cloth down as the knife and contingent mechanism operate, and that as the knife, &c., withdraws the folding-roller swings downward, folding the cloth 10 over and gluing it to the inner side of the pasteboard of the raw cases.

The connecting-rods r r, connecting the cams p p and the knife O, are provided with heads s s, to which are jointed connecting-rods s' s', the other ends of which are jointed to the arms s² s², attached to the rock-shaft s³, journaled in bearings in the hangers R, fastened to the under surfaces of the sides of the frame A. These hangers R have bearings for the shaft S, on which are fulcrumed the arms of the miter-shears T. These arms have pins t t projecting from them, which pass through eccentric-slots t' t' in the wings t² t², projecting from the hub t³, keyed to the rock-shaft s³. Thus when the rock-shaft is operated the shears T open and shut, operating simultaneously with the cutting-knife O. These shears and connecting mechanism may be adjusted laterally on the shafts S and hangers R to suit the different widths of cloth to be used.

Immediately between the feed-rollers H⁴ and H⁵ and H' and H³ are placed hemmers 1 and 2, placed on the line of travel of the cloth and board, which hem the cloth over the side edge of the cover preparatory to passing between the rollers H' and H³, which unite the glued cloth so hemmed with the inside of the covers. These hemmers are placed, and are moved laterally on the rods 3 and 4, so as to engage with any width of cloth, said rods resting upon and secured to the sides of the frame A. Fastened to the under surfaces of the sides of the frame A, by means of hangers 5 and 6, is a rectangular box-shaped glue-receptacle, so placed that it will intercept the cloth just before it passes around the gage-roller. It is composed of a hot-water tank, u, heated in any of the ordinary ways, and a glue-receptacle, u', which has bearings in its ends for the gluing-roller W, which glues the under surface of the cloth as it passes over it, said roller W being continually moistened with glue by entering the liquid glue beneath.

A paper-reel, V, is supported in suitable bearings, w, projecting from the end board, f⁵, of the hopper. It is placed midway in the machine and so as to supply to the feed-rollers H' H³ a narrow strip of paper to combine with the cloth making the back of the cover. Placed about the center of length of the roller H', of a thickness corresponding to the pasteboard backs, and in such position as to bear upon the strip of paper used to strengthen the backs of the cover, is a ferrule, V'.

The hopper being filled with boards and the bottom layer of boards pushed out, so that their edges and the end of the cloth meet between the first series of feed-rollers, the machine is started, giving a forward movement to the board and cloth corresponding in distance to the length of the covers and lap of cloth at both ends added. The feed-works of the machine then come to a complete rest and so remain until the cutting-off knife, end-folding device, and miter-shears perform their respective duties. Thus it will be noted that the feed-works and the other mechanism—namely, cutting-off knife, miter-shears, and end-folding device—work alternately.

The time occupied by the cutting-off knife, end-folding device, and miter-shears in performing their respective duties, all of which work nearly simultaneously, is invariably the same as that occupied by the feed-works, each set of machinery alternately doing its allotted work.

After the cutting-off knife has separated the cloth connecting the forward and rear covers held in the feed-works and the end-folding device has folded over the lap of cloth extending from and turned up at right angles to the forward end of the rear cover, said rear cover (or that portion between the cutting-off knife) is carried forward by the next movement of the feed-works, past and to the other side of the cutting-off knife, to the last series of rollers, and is, after said knife separates it from the next following cover, completed by the forward lap being pasted down onto the upper surface of the pasteboard (or inside of the cover) by said last series of rollers, and the lap of cloth extending from the rear edges of the pasteboards thereof is pasted down on said pasteboard by the oscillating folding-roller, substantially as hereinbefore described, and so on until the material is exhausted or the requisite number of covers obtained.

It has been before mentioned that the feed-works are made adjustable, so as to make covers of any length, and that the gage-roller is so located that with each movement of the feed-rollers it brings the miter directly over the cutting-off knife. When this is done, the different parts of the machine perform their respective duties in harmony, and the result is a book-cover made many times faster, more accurately and cheaply than by the tedious process now employed of making them by hand.

There may be immaterial changes made in our machine, as hereinbefore described, without departing from the spirit of our invention. For example, the connection-rods $s'$ $s''$ may be dispensed with, and the shears T be actuated directly by the heads $s$ $s$. Again, the hemmers need not necessarily be supported by and adjustable laterally on the transverse rods 3 and 4, but may be secured and adjusted on any suitable transverse frame desired.

We claim as our invention—

1. The combination, with the miter-shears T and the cutting-off knife O, of the gage-roller $a^7$, arranged so as to reverse the course of the cloth and adapted to regulate the length of cloth traveling between said miter-shears and knife into a number of whole pieces corresponding to the size of book-covers desired.

2. The hopper E, consisting of four corner-pieces, the two rear ones of which are adjustable longitudinally, the front and rear boards, the former of which is adjustable vertically, the adjustable gage-fingers riding on said boards, as described, and the bed-plate forming the bottom of said hopper, substantially as set forth.

3. The combination of the gage-slides provided with fingers and thumb-screws, and the hopper E, substantially as and for the purposes set forth.

4. The combination of the bearings $l'$, supported above the frame of the machine, the studs $l^3$, projecting vertically therefrom and passing through said bearings, the springs $l^4$ on the studs above the bearing, nuts $l^2$, and nuts $l^5$, for regulating the pressure thereof on said bearings, with the rollers H² and H³ and H⁴ and H⁵, whereby the pressure of the said rollers on the passing raw cases is controlled.

5. The connecting-rods $r$, operated by the cams $p$, and provided with heads $s$, to which are pivoted the rods $s'$, in combination with the miter-shears T and cutting-off knife O, as hereinbefore specified.

6. The miter-shears T, consisting of two arms pivoted, as shown, on the transverse rod S, and provided with laterally-projecting studs $t$, adapted to pass through eccentric slots $t'$ in the wings or arms $t^2$, arranged diametrically opposite each other on a boss, $t^3$, keyed fast to the rock-shaft $s^3$.

7. The cutting-off knife embedded in the bed-block, to which are hinged the pressure or folding blocks of specified shape and form having recesses in their inner surfaces, in which are inserted springs, all as and for the purposes stated.

8. The cam L, connecting-rod $m$, and arm $m'$, in combination with the folding-roller $o$ and pressure-bar $o'$, substantially as and for the purpose set forth.

9. The combination of the end-folding roller and pressure-bar with the cutting-off knife and folding or pressure blocks, substantially as described.

10. In a machine for making book-covers, the combination of the gluing-roller with the hopper E, feed-slide $e$, and feed-rollers H⁴ and H⁵, substantially as described.

11. In a machine for making book-covers, the combination of the side hemmers, 1 and 2, and the bars on which said hemmers are adjustable laterally, with the rollers H and H' H² and H³, end-folding rollers, holding-bar, cutting-off knife, and folding-blocks attached thereto.

12. The combination, with the paper-reel V, projecting longitudinally and centrally from the end board, $f^5$, adapted to supply a narrow strip of suitable material to strengthen the backs of the raw cases, of the rollers H' and H³, a ferrule on said roll H', and cutting-off knife O, as herein described.

13. The combination of the feed-rollers, hemmers, folding-roller, pressure-bar, and cutting-off knife and blocks, substantially as described.

14. The combination of the guide-roller $a^2$, miter-shears T, and gage-roller, substantially as described.

15. The combination, in a machine for making book-covers, of the miter-shears, gluing-roller, gage-roller, and hopper provided with the feed-slide, feed-rollers H' and H³ H⁴ and H⁵, hemmer, folding device, and cutting-off knife, substantially as described.

16. The combination of the friction-clutch, the series of gear-wheels arranged to convey the intermittent movement of the clutch to the feed and pressure rollers, and said feed and pressure rollers, with the cam $p$, connecting-rods $r$ and $s'$, cam C, rod $m$, the miter-shears, and cutting-off knife, whereby said shears, knife, and end-folding devices are operated alternately while the feed mechanism is at rest, and vice versa.

In testimony that we claim the foregoing as our invention we affix our signatures in presence of two witnesses.

GEORGE B. DURKEE.
ANGUS CAMPBELL.

Witnesses:
ALBIN K. DOE,
ORREN V. STOOKEY.